(12) United States Patent
Mullins

(10) Patent No.: US 11,563,700 B2
(45) Date of Patent: *Jan. 24, 2023

(54) DIRECTIONAL AUGMENTED REALITY SYSTEM

(71) Applicant: META PLATFORMS TECHNOLOGIES, LLC, Menlo Park, CA (US)

(72) Inventor: Brian Mullins, Altadena, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,549

(22) Filed: Sep. 3, 2020

(65) Prior Publication Data

US 2021/0092081 A1 Mar. 25, 2021

Related U.S. Application Data

(63) Continuation of application No. 15/692,764, filed on Aug. 31, 2017, now Pat. No. 10,812,422.

(51) Int. Cl.
| | |
|---|---|
| G06T 19/00 | (2011.01) |
| H04L 51/046 | (2022.01) |
| G06F 3/01 | (2006.01) |
| H04L 51/043 | (2022.01) |
| H04N 13/332 | (2018.01) |
| G02B 27/01 | (2006.01) |
| H04L 51/10 | (2022.01) |
| G06F 3/16 | (2006.01) |
| H04L 51/222 | (2022.01) |

(52) U.S. Cl.
CPC ........ *H04L 51/046* (2013.01); *G02B 27/0176* (2013.01); *G06F 3/011* (2013.01); *G06F 3/167* (2013.01); *G06T 19/006* (2013.01); *H04L 51/043* (2013.01); *H04L 51/10* (2013.01); *H04L 51/222* (2022.05); *H04N 13/332* (2018.05)

(58) Field of Classification Search
None
See application file for complete search history.

(56) References Cited

U.S. PATENT DOCUMENTS

| 10,812,422 B2 | 10/2020 | Mullins |
| 2014/0081634 A1 | 3/2014 | Forutanpour et al. |

(Continued)

OTHER PUBLICATIONS

U.S. Appl. No. 15/692,764 U.S. Pat. No. 10,812,422, filed Aug. 31, 2017, Directional Augmented Reality System.

(Continued)

*Primary Examiner* — Yanna Wu
(74) *Attorney, Agent, or Firm* — Fenwick & West LLP

(57) ABSTRACT

A head-mounted device (HMD) of a first user has a transparent display. The HMD determines location information of a second user relative to the HMD of the first user. The second user is located within a predefined distance of the HMD. The location information identifies a distance and a direction of the second user relative to the HMD. The HMD receives audio content from the second user, generates augmented reality (AR) content based on the audio content, and displays the AR content in the transparent display based on the location information of the second user. The AR content appears coupled to the second user.

20 Claims, 11 Drawing Sheets

(56) References Cited

U.S. PATENT DOCUMENTS

| | | | |
|---|---|---|---|
| 2015/0269783 A1* | 9/2015 | Yun | G06F 3/0304 |
| | | | 345/633 |
| 2015/0296289 A1 | 10/2015 | Lakkundi et al. | |
| 2016/0131908 A1 | 5/2016 | Fateh | |
| 2016/0182435 A1 | 6/2016 | Landqvist et al. | |
| 2017/0045941 A1 | 2/2017 | Tokubo et al. | |
| 2019/0068529 A1 | 2/2019 | Mullins | |

OTHER PUBLICATIONS

"U.S. Appl. No. 15/692,764, Final Office Action dated Jan. 28, 2020", 26 pgs.

"U.S. Appl. No. 15/692,764, Final Office Action dated May 22, 2019", 26 pgs.

"U.S. Appl. No. 15/692,764, Non Final Office Action dated Jan. 3, 2019", 23 pgs.

"U.S. Appl. No. 15/692,764, Non Final Office Action dated Oct. 23, 2019", 27 pgs.

"U.S. Appl. No. 15/692,764, Notice of Allowance dated Jun. 5, 2020", 14 pgs.

"U.S. Appl. No. 15/692,764, Response filed Jan. 9, 2020 to Non Final Office Action dated Oct. 23, 2019", 13 pgs.

"U.S. Appl. No. 15/692,764, Response filed Mar. 27, 2020 to Final Office Action dated Jan. 28, 2020", 14 pgs.

"U.S. Appl. No. 15/692,764, Response filed Sep. 23, 2019 to Final Office Action dated May 22, 2019", 11 pgs.

"U.S. Appl. No. 15/692,764, Response filed Apr. 2, 2019 to Non Final Office Action dated Jan. 3, 2019", 10 pgs.

* cited by examiner

DIRECTIONAL AUGMENTED REALITY SYSTEM

PRIORITY APPLICATION

This application claims priority to U.S. Provisional application Ser. No. 15/692,764, filed Aug. 31, 2017, the disclosure of which is incorporated herein in its entirety by reference.

TECHNICAL FIELD

The subject matter disclosed herein generally relates to an augmented reality system. Specifically, the present disclosure addresses systems and methods for generating and displaying augmented reality content.

BACKGROUND

An augmented reality (AR) device can be used to generate and display data in addition to an image captured with the AR device. As used herein, AR is and includes a live, direct, or indirect view of a physical, real-world environment whose elements are augmented by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
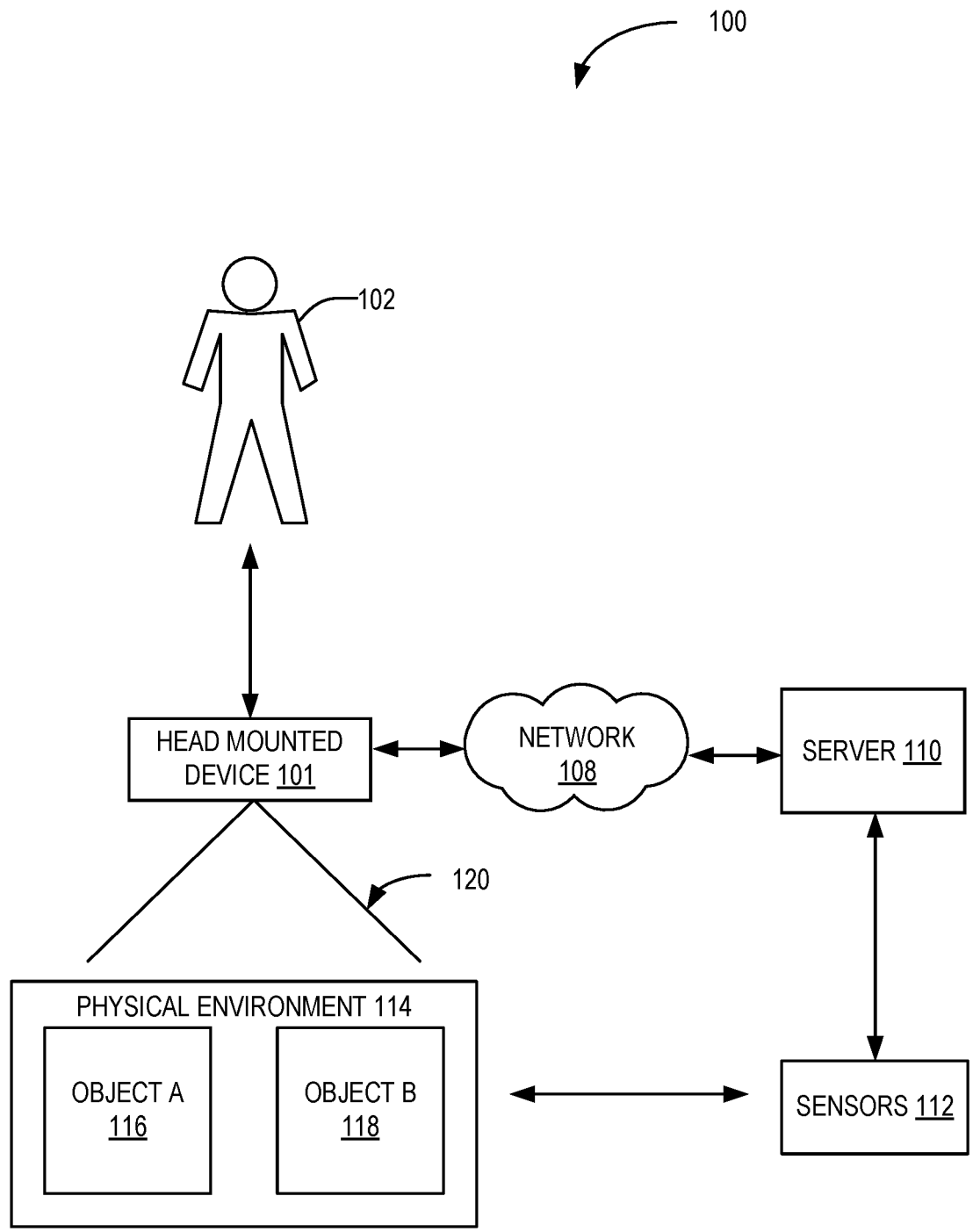
FIG. 1 is a block diagram illustrating an example of a network suitable for operating an augmented reality application of a head-mounted device (HMD) system, according to some example embodiments.

Example methods and systems are directed to context-based augmented reality (AR) content and audio notification in a head-mounted device (HMD). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An HMD displays AR information in a display of the HMD to provide workers with relevant information in their work environment. The present disclosure describes an HMD that includes a directional AR content application designed to selectively capture audio, for example, speech from another user and display a translation of the speech to another preselected language as AR content in a transparent display of the HMD. The AR content appears as a text bubble hovering above and following the other user. In other words, the user of the HMD perceives the text bubble as hovering above the other user and following the other user relative to a field of view of the HMD.

In one example, the user of the HMD may approach another person who may speak a different language. The HMD determines the position of the other person relative to the HMD (e.g., the person is on the left side within a field of view of a camera in the HMD). The HMD also determines how far the other person is located relative to the HMD. Those of ordinary skill in the art will recognize that different types of sensors can be used to determine the position and distance of the other person relative to the HMD. For example, audio sensors use beamforming techniques of an array of microphones disposed in and around the HMD to identify the position and distance of another person who is speaking. Visual sensors such as infrared sensors and time-of-flight sensors can be used to determine the presence, location, and distance of the other person relative to the HMD. When a device is located on the other person, other wireless sensors (e.g., Wi-Fi, Bluetooth, zigbee) can be used to locate and identify the position of the other person relative to the HMD. Furthermore, if the device on the other person includes a microphone, the device can record audio from the other person and send the audio data to the HMD for processing. In another example, the device on the other person transcribes the audio from the other person using speech recognition techniques and sends the text to the HMD for processing. The HMD uses the position and location information to display the AR content as appearing coupled to the person who is speaking.

In one example embodiment, an HMD includes a transparent display. The HMD determines location information of a second user relative to a first user of the HMD. The second user is located within a predefined distance of the HMD. The location information identifies a distance and a direction of the second user relative to the HMD. The HMD receives audio content from the second user, generates AR content based on the audio content, and displays the AR content in the transparent display based on the location information of the second user. The AR content appears coupled to the second user.

In another example embodiment, the HMD translates the audio content from a first language associated with the audio content to a second language selected by the first user. The HMD then transcribes the translated audio content and forms the AR content with text from the transcribed and translated audio content.

In another example embodiment, the size of the text decreases in response to the increasing distance between the second user and the HMD.

In another example embodiment, the HMD determines location information of a third user relative to the first user of the HMD. The third user is located within the predefined distance of the HMD. The location information of the third user identifies a distance and a direction of the third user relative to the HMD. The HMD receives audio content from the third user. The HMD generates other AR content based on the audio content from the third user. The other AR content is displayed in the transparent display based on the location information of the third user. The other AR content appears coupled to the third user.

In another example embodiment, the HMD includes an array of microphones. The array of microphones is used to receive first audio data from the second user and second audio data from the third user. Adaptive beamforming is used on the first audio data to determine the distance and direction of the second user relative to the HMD. Adaptive beamforming is used on the second audio data to determine the distance and direction of the third user relative to the HMD.

In another example embodiment, a distance sensor is configured to detect a presence of the second user within the predefined distance, and to measure the distance and the direction of the second user relative to the HMD.

In another example embodiment, the HMD receives an electronic communication from a second HMD of the second user, the electronic communication including the location information of the second user and the audio content from the second user.

In another example embodiment, the HMD extracts audio data from the audio content in the electronic communication and generates the AR content based on the audio data.

In another example embodiment, the HMD processes the audio data with speech recognition to generate text data corresponding to the audio data. The text data is translated from a first language associated with the audio data to a second language selected by the first user. The AR content is formed with the translated text data.

In another example embodiment, the transparent display displays a speech bubble that appears coupled to the second user. The speech bubble includes the translated text data.

In another example embodiment, the HMD includes an AR application that identifies an object in an image captured with a camera, retrieves a three-dimensional model of a virtual object from an AR content based on the identified object, and renders the three-dimensional model of the virtual object in the transparent display. The virtual object is perceived as an overlay on the real-world object.

The display of the HMD may be retracted inside the helmet and extended outside the helmet to allow a user to view the display. The position of the display may be adjusted based on an eye level of the user. The display includes a display lens capable of displaying AR content. The helmet may include a computing device such as a hardware processor with an AR application that allows the user wearing the helmet to experience information, such as in the form of a virtual object such as a three-dimensional (3D) virtual object, overlaid on an image or a view of a physical object (e.g., a gauge) captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid on or engaged with a view or an image of the physical object, is generated in the display lens of the helmet. The display lens may be transparent to allow the user see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet or other inputs from other devices, such as a wearable device. For example, the display lenses may extend or retract based on a voice command of the user, a gesture of the user, or a position of a watch in communication with the helmet.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR application of an HMD with display lenses, according to some example embodiments. The network environment 100 includes an HMD 101 and a server 110, communicatively coupled to each other via a network 108. The HMD 101 and the server 110 may each be implemented in a computer system, in whole or in part, as described below with respect to FIG. 10.

The server 110 may be part of a network-based system. For example, the network-based system may be or include a cloud-based server system that provides AR content (e.g., augmented information including 3D models of virtual objects related to physical objects in images captured by the HMD 101) to the HMD 101.

The HMD 101 may include a helmet or glasses that a user 102 may wear to view the AR content related to captured images of several physical objects (e.g., object A 116, object B 118) in a real-world physical environment 114. The objects A 116 and B 118 are located within a field of view 120 of the HMD 101. In one example embodiment, the HMD 101 includes a computing device with a camera and a display (e.g., smart glasses, smart helmet, smart visor, smart face shield, or smart contact lenses). The computing device may be removably mounted to the head of the user 102. In one example, the display may be a screen that displays what is captured with a camera of the HMD 101. In another example, the display of the HMD 101 may be a transparent display, such as in the visor or face shield of a helmet, or a display lens distinct from the visor or face shield of the helmet.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101.

In one example embodiment, the AR application determines the AR content to be rendered and displayed in the display lenses of the HMD 101 based on sensor data related to the user 102 and sensor data related to the HMD 101. The sensor data related to the user 102 may include measurements of a heart rate, a blood pressure, brain activity, and biometric data related to the user 102. The sensor data related to the HMD 101 may include a geographic location of the HMD 101, an orientation and position of the HMD 101, an ambient pressure, an ambient humidity level, an ambient light level, and an ambient noise level detected by sensors in the HMD 101. The sensor data related to the user 102 may also be referred to as "user-based sensor data." The sensor data related to the HMD 101 may be also referred to as "ambient-based sensor data." For example, the HMD 101 may display first AR content when the user 102 wearing the HMD 101 is on the first floor of a building. The HMD 101 may display second AR content, different from the first AR content, when the user 102 is on the second floor of the building. In another example, the HMD 101 may display AR content when the user 102 is alert and located in front of machine Ml. The HMD 101 may display different AR content when the user 102 is nervous or sleepy and is located in front of the same machine Ml. In another example, the HMD 101 provides a first AR application (e.g., showing schematic diagrams of a building) when the user 102 is identified as a firefighter and is located on the first floor of a building. The HMD 101 may provide a second AR application (e.g., showing locations of non-functioning sprinklers) when the user 102 is identified as a firefighter and sensors in the building indicate a temperature exceeding a threshold (e.g., because of a fire in the building). Therefore, different AR content and different AR applications may be provided to the HMD 101 based on a combination of the user-based sensor data and the ambient-based sensor data.

In another example embodiment, the AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real-world physical environment 114. The AR application may include computer vision recognition to determine corners, objects, lines, and letters. The user 102 may point a camera of the HMD 101 to capture an image of the objects A 116 and B 118 in the physical environment 114.

In one example embodiment, the objects A 116, B 118 in the image are tracked and recognized locally in the HMD 101 using a local context recognition dataset or any other previously stored dataset of the AR application of the HMD 101. The local context recognition dataset module may include a library of virtual objects associated with the real-world physical objects A 116, B 118 or references. In one example, the HMD 101 identifies feature points in an image of the objects A 116, B 118 to determine different planes (e.g., edges, corners, surface, dial, letters). The HMD 101 may also identify tracking data related to the objects A 116, B 118 (e.g., GPS location of the HMD 101, orientation, or distances to the objects A 116, B 118). If the captured image is not recognized locally at the HMD 101, the HMD 101 can download additional information (e.g., a 3D model or other augmented data) corresponding to the captured image, from a database of the server 110 over the network 108.

In another embodiment, the objects A 116, B 118 in the image are tracked and recognized remotely at the server 110 using a remote context recognition dataset or any other previously stored dataset of an AR application in the server 110. The remote context recognition dataset module may include a library of virtual objects or augmented information associated with the real-world physical objects A 116, B 118 or references.

Sensors 112 may be associated with, coupled to, or related to the objects A 116 and B 118 in the physical environment 114 to measure a location, information, or captured readings from the objects A 116 and B 118. Examples of captured readings may include, but are not limited to, weight, pressure, temperature, velocity, direction, position, intrinsic and extrinsic properties, acceleration, and dimensions. For example, the sensors 112 may be disposed throughout a factory floor to measure movement, pressure, orientation, and temperature. The server 110 can compute readings from data generated by the sensors 112. The server 110 can generate virtual indicators such as vectors or colors based on data from the sensors 112. The virtual indicators are then overlaid on top of a live image of the objects A 116 and B 118 to show data related to the objects A 116 and B 118. For example, the virtual indicators may include arrows with shapes and colors that change based on real-time data. The visualization may be provided to the HMD 101 so that the HMD 101 can render the virtual indicators in a display of the HMD 101. In another embodiment, the virtual indicators are rendered at the server 110 and streamed to the HMD 101. The HMD 101 displays the virtual indicators or a visualization corresponding to a display of the physical environment 114 (e.g., data is visually perceived as displayed adjacent to the objects A 116 and B 118).

The sensors 112 may include other sensors used to track the location, movement, and orientation of the HMD 101 externally without having to rely on internal sensors in the HMD 101. The sensors 112 may include optical sensors (e.g., a depth-enabled 3D camera), wireless sensors (e.g., Bluetooth, Wi-Fi), GPS sensors, and audio sensors to determine the location of the user 102 having the HMD 101, a distance of the user 102 to the sensors 112 in the physical environment 114 (e.g., sensors 112 placed in corners of a venue or a room), and the orientation of the HMD 101 to track what the user 102 is looking at (e.g., a direction in which the HMD 101 is pointed, such as towards a player on a tennis court or at a person in a room).

In another embodiment, data from the sensors 112 and internal sensors in the HMD 101 may be used for analytics data processing at the server 110 (or another server) for analysis of usage and how the user 102 is interacting with the physical environment 114. Live data from other servers may also be used in the analytics data processing. For example, the analytics data may track at what locations (e.g., points or features) on a physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., whether the user 102 tapped on a link in the virtual object), and any suitable combination thereof. The HMD 101 receives a visualization content dataset related to the analytics data. The HMD 101 then generates a virtual object with additional or visualization features, or a new experience, based on the visualization content dataset.

In one example embodiment, the HMD 101 uses an array of audio sensors to detect and record audio content from another person interacting with the user 102. The HMD 101 transcribes and translates the audio content. The transcribed and translated audio content is displayed as AR content at the HMD 101 so that the user 102 perceives the AR content as coupled to the other person.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 108 may be any network that enables communication between or among machines (e.g., the server 110), databases, and devices (e.g., the HMD 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
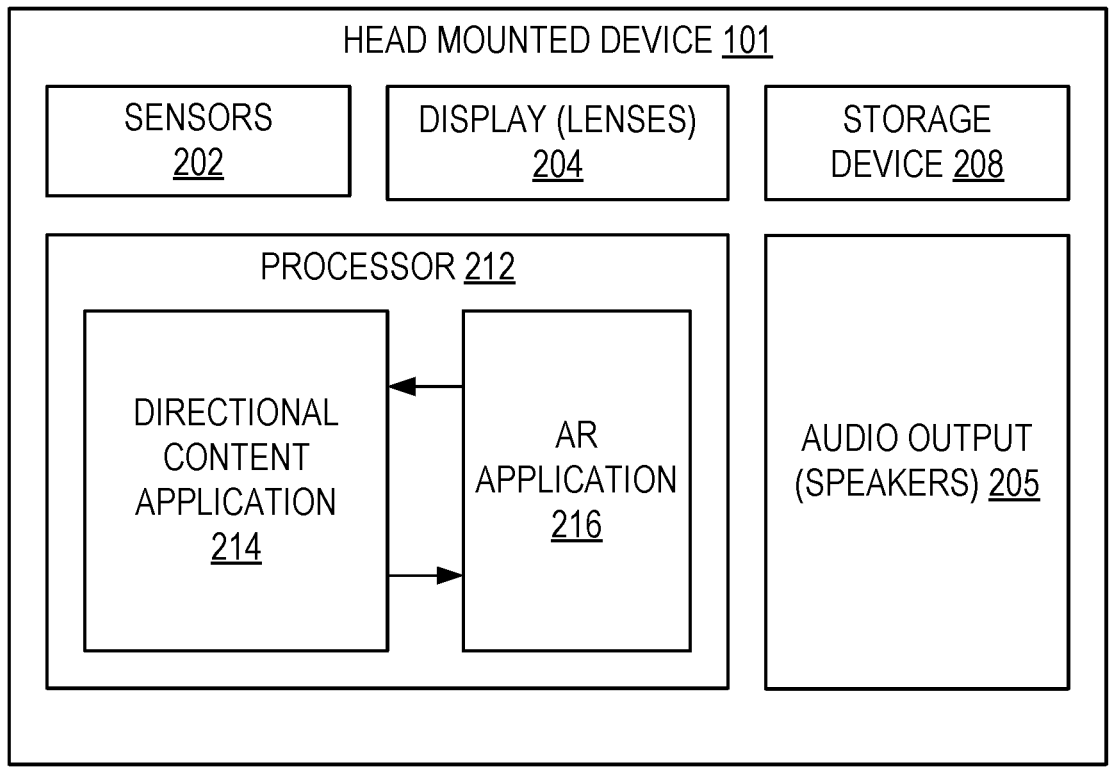
FIG. 2 is a block diagram illustrating an example embodiment of a HMD.

FIG. 2 is a block diagram illustrating modules (e.g., components) of the HMD 101, according to some example embodiments. The HMD 101 may be a helmet that includes sensors 202, a display 204, a storage device 208, an audio output (e.g., speakers) 205, and a processor 212. The HMD 101 may not be limited to a helmet and may include any type of device that can be worn on the head of a user, e.g., the user 102, such as glasses, a hat, or a visor.

The sensors 202 may be used to generate internal tracking data of the HMD 101 to determine a position and an orientation of the HMD 101. The position and the orientation of the HMD 101 may be used to identify real-world objects in a field of view of the HMD 101. For example, a virtual object may be rendered and displayed in the display 204 when the sensors 202 indicate that the HMD 101 is oriented towards a real-world object (e.g., when the user 102 looks at object A 116 that is within a field of view 120 of the sensors 202) or in a particular direction (e.g., when the user 102 tilts his head to watch his wrist). The HMD 101 may also display a virtual object based on a geographic location of the HMD 101. For example, a set of virtual objects may be accessible when the user 102 of the HMD 101 is located in a particular building. In another example, virtual objects including sensitive material may be accessible when the user 102 of the HMD 101 is located within a predefined area associated with the sensitive material and the user is authenticated. Different levels of content of the virtual objects may be accessible based on a credential level of the user. For example, a user who is an executive of a company may have access to more information or content in the virtual objects than a manager at the same company. The sensors 202 may be used to authenticate the user prior to providing the user with access to the sensitive material (e.g., information displayed as a virtual object such as a virtual dialog box in a see-through display). Authentication may be achieved via a variety of methods such as providing a password or an authentication token, or using the sensors 202 to determine biometric data unique to the user.

Figure 3:
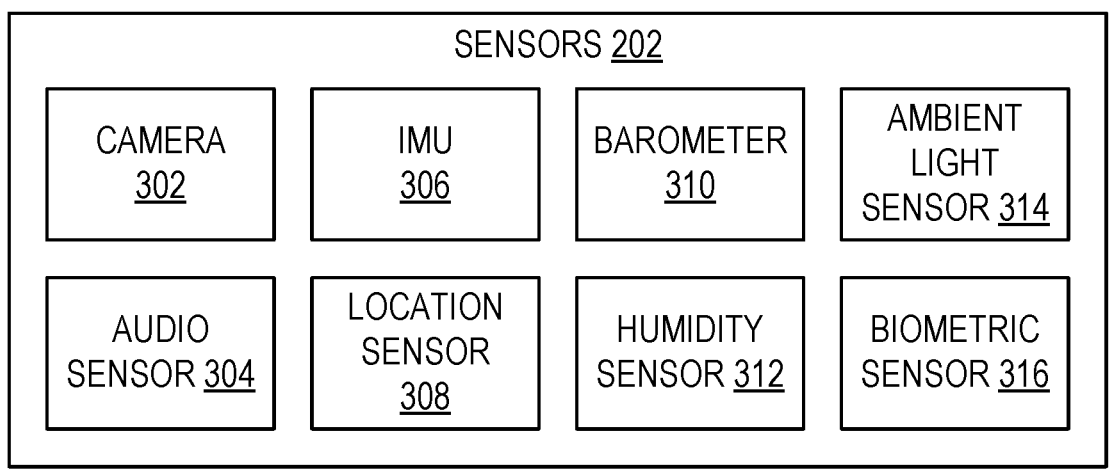
FIG. 3 is a block diagram illustrating examples of sensors.

FIG. 3 is a block diagram illustrating examples of the sensors 202 in the HMD 101. For example, the sensors 202 may include a camera 302, an audio sensor 304, an Inertial Measurement Unit (IMU) sensor 306, a location sensor 308, a barometer 310, a humidity sensor 312, an ambient light sensor 314, and a biometric sensor 316. It is to be noted that the sensors 202 described herein are for illustration purposes. The sensors 202 are thus not limited to the ones described.

The camera 302 includes an optical sensor(s) (e.g., camera) that may encompass different spectrums. The camera 302 may include one or more external cameras aimed outside the HMD 101. For example, the external camera may include an infrared camera or a full-spectrum camera. The external camera may include a rear-facing camera and a front-facing camera disposed in the HMD 101. The front-facing camera may be used to capture a front field of view of the HMD 101, while the rear-facing camera may be used to capture a rear field of view of the HMD 101. The pictures captured with the front- and rear-facing cameras may be combined to recreate a 360-degree view of the physical world around the HMD 101. In another example, the camera 302 includes a time-of-flight camera used to determine distance between the HMD 101 and a subject (e.g., another user) in an image captured with the camera.

The camera 302 may include one or more internal cameras aimed at the user 102. The internal camera may include an infrared (IR) camera configured to capture an image of a retina of the user 102. The IR camera may be used to perform a retinal scan to map unique patterns of the retina of the user 102.

Blood vessels within the retina absorb light more readily than the surrounding tissue in the retina and therefore can be identified with IR lighting. The IR camera may cast a beam of IR light into the user 102's eye as the user 102 looks through the display 204 (e.g., lenses) towards virtual objects rendered in the display 204. The beam of IR light traces a path on the retina of the user 102. Because retinal blood vessels absorb more of the IR light than the rest of the eye, the amount of reflection varies during the retinal scan. The pattern of variations may be used as biometric data unique to the user 102.

In another example embodiment, the internal camera may include an ocular camera configured to capture an image of an iris of the eye of the user 102. In response to the amount of light entering the eye, muscles attached to the iris expand or contract the aperture at the center of the iris, known as the pupil. The expansion and contraction of the pupil depends on the amount of ambient light. The ocular camera may use iris recognition as a method for biometric identification. The complex pattern on the iris of the eye of the user 102 is unique and can be used to identify the user 102. The ocular camera may cast IR light to acquire images of detailed structures of the iris of the eye of the user 102. Biometric algorithms may be applied to the images of the detailed structures of the iris to identify the user 102.

In another example embodiment, the ocular camera includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined trigger events (e.g., the user 102 walks into a different room, there are sudden changes in the ambient light, or the like).

The audio sensor 304 may include an array of microphones disposed around the HMD 101. For example, the array of microphones may be used to record audio content from the ambient environment or audio content from the user 102. In other examples, the array of microphones may be used to measure an ambient noise level to determine an intensity of background noise ambient to the HMD 101. In another example, the array of microphones may be used to capture speech from another person within a preset distance of the HMD 101. Analytics may be applied to the captured speech to identify a language, transcribe the speech, translate the transcribed speech to another language, and provide the transcribed translated speech to an AR application 216.

The IMU sensor 306 may include a gyroscope and an inertial motion sensor to determine an orientation and movement of the HMD 101. For example, the IMU sensor 306 may measure the velocity, orientation, and gravitational forces on the HMD 101. The IMU sensor 306 may also detect a rate of acceleration using an accelerometer, and changes in angular rotation using a gyroscope.

The location sensor 308 may determine a geolocation of the HMD 101 using a variety of techniques such as near-field communication, GPS, Bluetooth, and Wi-Fi. For example, the location sensor 308 may generate geographic coordinates of the HMD 101.

The barometer 310 may measure an atmospheric pressure differential to determine an altitude of the HMD 101. For example, the barometer 310 may be used to determine whether the HMD 101 is located on a first floor or a second floor of a building.

The humidity sensor 312 may determine a relative humidity level ambient to the HMD 101. For example, the humidity sensor 312 determines the humidity level of a room in which the HMD 101 is located.

The ambient light sensor 314 may determine an ambient light intensity around the HMD 101. For example, the ambient light sensor 314 measures the ambient light in a room in which the HMD 101 is located.

The biometric sensor 316 include sensors configured to measure biometric data unique to the user 102 of the HMD 101. In one example embodiment, the biometric sensor 316 includes an ocular camera, an EEG (electroencephalogram) sensor, and an ECG (electrocardiogram) sensor. It is to be noted that the descriptions of the biometric sensors 316 disclosed herein are for illustration purposes. The biometric sensor 316 is thus not limited to any of the ones described.

The EEG sensor includes, for example, electrodes that, when in contact with the skin of the head of the user 102, measure electrical activity of the brain of the user 102. The EEG sensor may also measure the electrical activity and wave patterns through different bands of frequency (e.g., Delta, Theta, Alpha, Beta, Gamma, Mu). EEG signals may be used to authenticate a user based on fluctuation patterns unique to the user.

The ECG sensor includes, for example, electrodes that measure a heart rate of the user 102. In particular, the ECG sensor may monitor and measure the cardiac rhythm of the user 102. A biometric algorithm is applied to the user 102 to identify and authenticate the user 102. In one example embodiment, the EEG sensor and the ECG sensor may be combined into a same set of electrodes to measure both brain electrical activity and heart rate. The set of electrodes may be disposed around the helmet so that the set of electrodes comes into contact with the skin of the user 102 when the user 102 wears the HMD 101.

Referring back to FIG. 2, the display 204 may include a display surface or lens capable of displaying AR content (e.g., images, video) generated by the processor 212. The display 204 may be transparent so that the user 102 can see through the display 204 (e.g., such as in a head-up display).

The storage device 208 stores a library of AR content, a speech recognition application, a language dictionary, a contextual content dataset, and reference objects. The AR content may include two- or three-dimensional models of virtual objects with corresponding audio. In other examples, the AR content may include an AR application that includes interactive features such as displaying additional data (e.g., locations of sprinklers) in response to user input (e.g., a user says, "Show me the locations of the sprinklers" while looking at an AR overlay showing locations of the exit doors). AR applications may have their own different functionalities and operations. Therefore, each AR application may operate distinctly from other AR applications.

The storage device 208 may also store a database of identifiers of wearable devices capable of communicating with the HMD 101. In another embodiment, the database may also identify reference objects (visual references or images of objects) and corresponding experiences (e.g., 3D virtual objects, interactive features of the 3D virtual objects). The database may include a primary content dataset, a contextual content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include images depicting covers of the ten most viewed devices and their corresponding experiences (e.g., virtual objects that represent the ten most viewed sensing devices on a factory floor). In another example, the server 110 may generate the first set of images based on the most popular or often scanned images received at the server 110. Thus, the primary content dataset does not depend on the objects A 116, B 118 or images scanned by the HMD 101.

The contextual content dataset includes, for example, a second set of images and corresponding experiences (e.g., 3D virtual object models) retrieved from the server 110. For example, images captured with the HMD 101 that are not recognized (e.g., by the HMD 101) in the primary content dataset are submitted to the server 110 for recognition. If the captured image is recognized by the server 110, a corresponding experience may be downloaded at the HMD 101 and stored in the contextual content dataset. Thus, the contextual content dataset relies on the contexts in which the HMD 101 has been used. As such, the contextual content dataset depends on objects or images scanned by the AR application 216 of the HMD 101.

In one example embodiment, the HMD 101 may communicate over the network 108 with the server 110 to access a language dictionary and AR content at the server 110. The HMD 101 may also communicate with the server 110 to authenticate the user 102. In another example embodiment, the HMD 101 retrieves a portion of a database of visual references, corresponding 3D virtual objects, and corresponding interactive features of the 3D virtual objects.

The processor 212 may include a directional content application 214 and the AR application 216. The directional content application 214 detects audio content and a location of the source of the audio content. For example, the directional content application 214 detects audio content originating from another user located within a preset distance or radius of the HMD 101 (e.g., a person standing in front of the HMD 101 and speaking in a first language (e.g., Spanish) to the user 102 of the HMD 101). The HMD 101 includes an array of microphones used to estimate the direction and distance of the person speaking to the user 102. Triangulation of the position or location of the person relative to multiple HMDs can be used to further refine the location of the person. The directional content application 214 transcribes a translation of the audio content and provides the text and location data to the AR application 216.

In another example embodiment, the directional content application 214 receives an electronic communication from a second HMD worn by the person speaking to the user 102. The second HMD records a speech from the person and wirelessly provides the audio content via an electronic file (e.g., audio file) sent to the HMD 101. In another example, the second HMD sends the electronic file to the server 110 for translation and transcription. In yet another example, the second HMD transcribes and translates the speech from the person wearing the second HMD. The second HMD includes a translated transcript of the speech in the electronic file sent to the HMD 101.

The AR application 216 generates AR content that includes the text of translated audio content from the person speaking to the user 102. The AR application 216 can further adjust the size or content of the AR content based on a location and orientation of the person relative to the HMD 101, and the distance between the HMD 101 and the person.

In another example embodiment, the AR application 216 generates a display of information related to the objects A 116, B 118. In one example embodiment, the AR application 216 generates a visualization of information related to the objects A 116, B 118 when the HMD 101 captures an image of the objects A 116, B 118 and recognizes the objects A 116, B 118, or when the HMD 101 is in proximity to the objects A 116, B 118. For example, the AR application 216 generates a display of a holographic or virtual menu visually perceived as a layer on the objects A 116, B 118.

Figure 4:
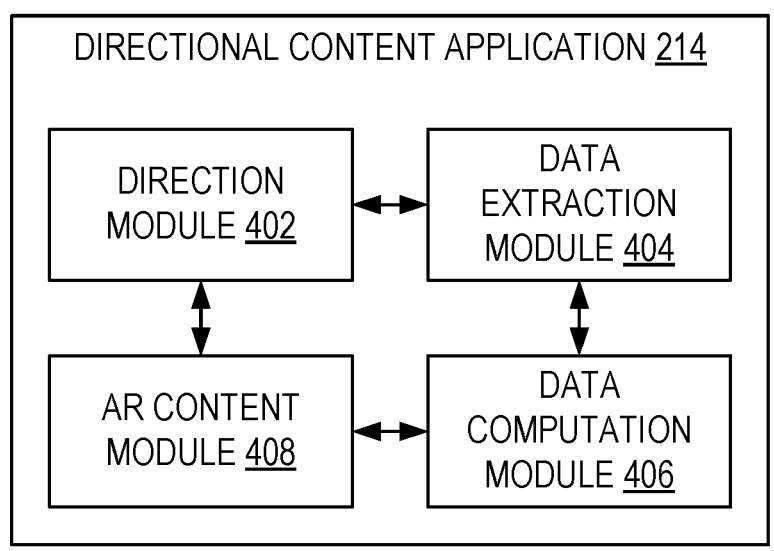
FIG. 4 is a block diagram illustrating an example embodiment of a directional content application.

FIG. 4 is a block diagram illustrating an example embodiment of the directional content application 214. The directional content application 214 is shown, by way of example, to include a direction module 402, a data extraction module 404, a data computation module 406, and an AR content module 408.

The direction module 402 uses the array of microphones to periodically (e.g., every 30 seconds) sample and analyze the user's environment. For example, the direction module 402 detects audio content (e.g., speech from another person) and determines a location of the person relative to the HMD 101 using a beamforming technique. In another example, the direction module 402 uses other types of sensors (e.g., a time-of-flight sensor) to detect the presence of a person within a preset radius of the HMD 101, a relative location of the person with respect to the HMD 101, and a distance between the person and the HMD 101. Other computer-vision based techniques (e.g., facial recognition) can be used to determine whether the person is speaking, facing the user 102, and addressing the user 102.

Those of ordinary skill in the art will recognize that beamforming techniques can be used to identify the location and distance of a sound origin relative to the HMD 101. In another example embodiment, the direction module 402 uses other types of sensors outside the HMD 101 (e.g., external sensors 112) to determine and identify the location and distance of the person (e.g., using motion sensors or sensors placed on the person). For example, the HMD 101 receives an identification of the location and distance of the person relative to a location and orientation of the HMD 101.

The data extraction module 404 records audio content from the speech of the person facing the user 102. In one example, the array of microphones in the HMD 101 uses a beamforming technique to isolate the audio content from the person facing the user 102. In another example, the data extraction module 404 receives audio data from another HMD worn by the person speaking to the user 102. The data extraction module 404 receives an electronic communication from the other HMD. The electronic communication includes the audio content (e.g., an audio file or transcribed audio).

The data computation module 406 uses voice recognition techniques or text translation algorithms to translate the audio content of the person speaking to the user 102. For example, the data computation module 406 uses voice recognition techniques to first transcribe the audio content to text and translation techniques to translate the text to another language. In another example embodiment, the HMD 101 identifies the person speaking to the user 102 and retrieves or determines a language associated with the identification of the person. The HMD 101 then uses voice recognition techniques to first transcribe the audio content from the identified language and translate the transcribed audio content to a preset language associated with the user 102 of the HMD 101. In another example embodiment, the HMD 101 receives an electronic file that includes audio content from the HMD worn by the person speaking to the user 102 and an identification of the language associated with the person wearing the HMD.

The AR content module 408 generates AR content based on the translated audio content. The AR content can be, for example, a text of the translated speech of the person speaking to the user 102. The text may be displayed in a speech bubble above the head of the person. In another example, the format or font of the text may change based on an identification of the person speaking to the user 102. The text may include bold font for an executive-level person. In another example, the text appears to be coupled to the person so that the text bubble appears to follow the person. The size of the text and text bubble may increase or decrease based on the distance between the person and the user 102 of the HMD 101. For example, the size of the text appears smaller with an increasing distance between the person and the HMD 101.

Figure 5:
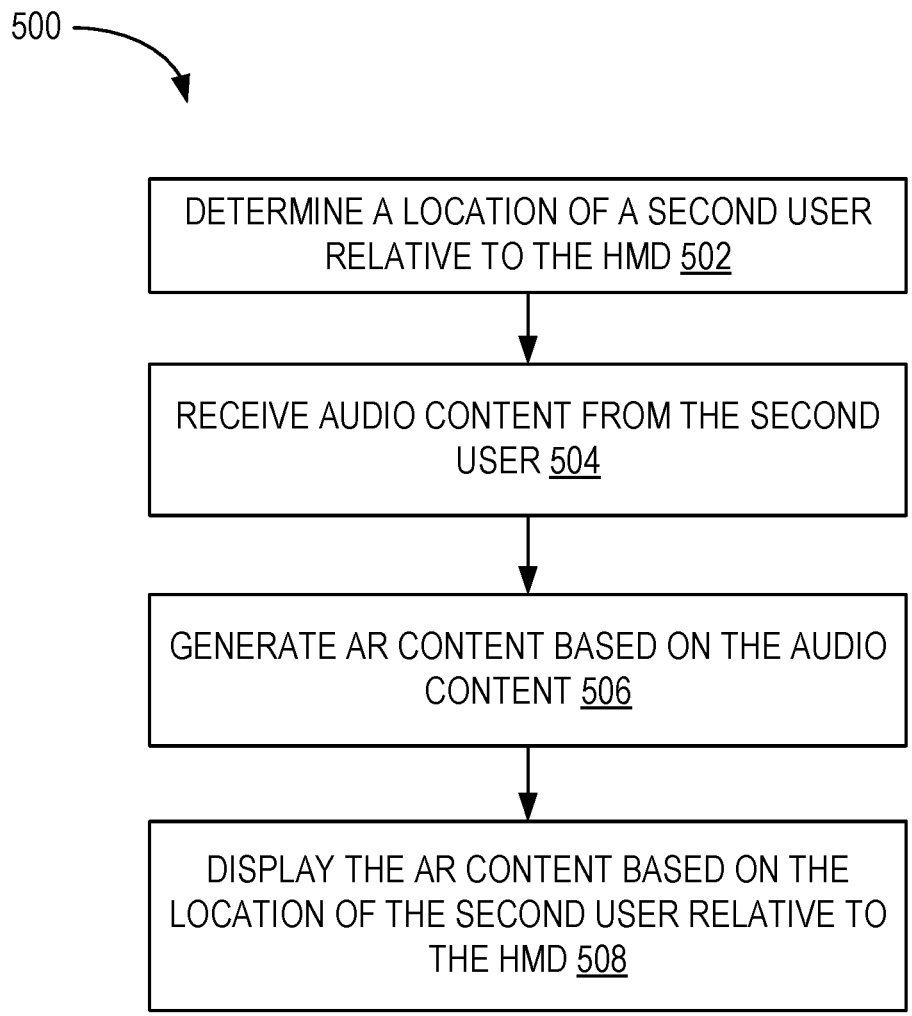
FIG. 5 is a flowchart illustrating a method for extracting audio data and displaying augmented reality content, according to an example embodiment.

FIG. 5 is a flowchart illustrating a method 500 for extracting audio data and displaying AR content, according to an example embodiment. At operation 502, the HMD 101 determines a location of a second user relative to the HMD 101. The second user includes a person speaking to the user 102 of the HMD 101. The HMD 101 detects that the second user is located within a preset radius of the HMD 101. Operation 502 can be implemented with the direction module 402.

At operation 504, the HMD 101 receives audio content from the second user. This can be accomplished in several ways. In one example, the HMD 101 includes an array of microphones that records audio from the second user. Operation 504 can be implemented with the data extraction module 404.

At operation 506, the HMD 101 generates AR content based on the audio content received from the second user. For example, the AR content includes a text translation of a speech from the second user. Operation 506 can be implemented with the AR content module 408.

At operation 508, the HMD 101 displays the AR content in the display 204 based on the location of the second user relative to the HMD 101 such that the AR content appears coupled to the second user as perceived by the user 102. Operation 508 can be implemented with the AR content module 408.

Figure 6:
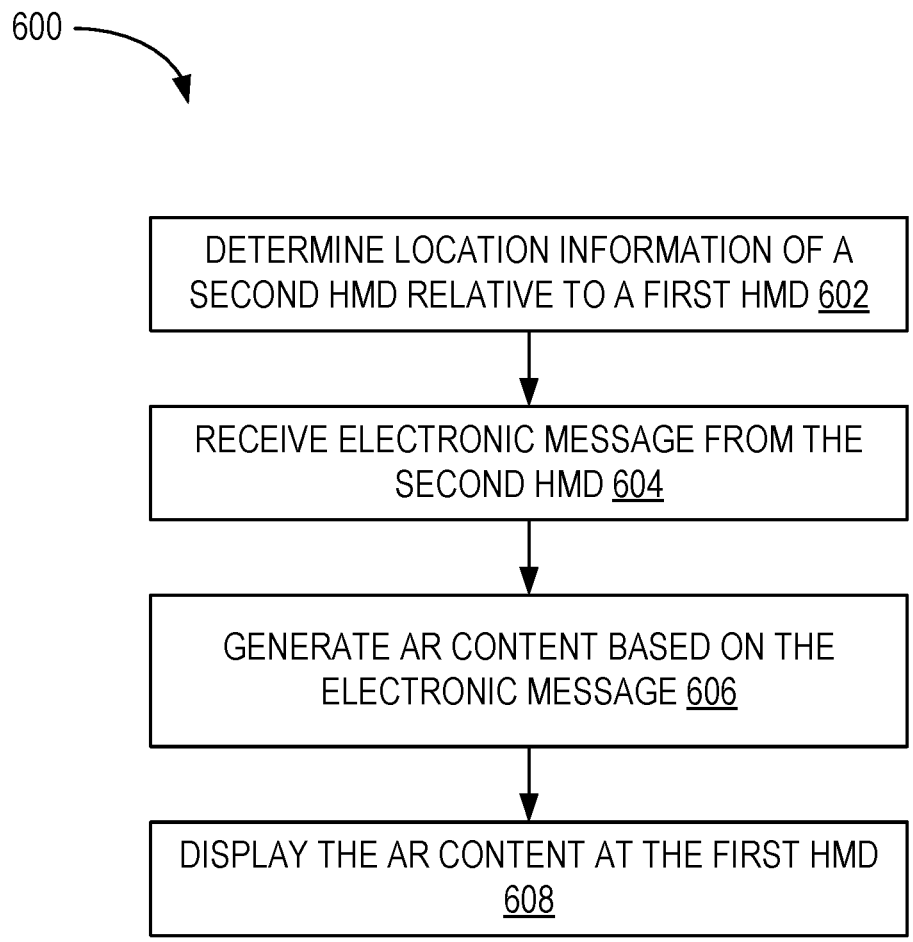
FIG. 6 is a flowchart illustrating a method for receiving audio data and displaying augmented reality content, according to an example embodiment.

FIG. 6 is a flowchart illustrating a method 600 for receiving audio data and displaying AR content, according to an example embodiment. At operation 602, the HMD 101 determines location information of a second HMD relative to the first HMD (e.g., the HMD 101). A second user wears the second HMD. There can be several ways to determine the location information of the second HMD. Location sensors from the second HMD can be used to identify a location of the second HMD. In another example, the location information can be determined based on sensors external to both the first HMD and the second HMD. Location sensors can include GPS devices, Bluetooth devices, Wi-Fi devices, infrared sensors, and time-of-flight cameras. Operation 602 can be implemented with the direction module 402.

At operation 604, the HMD 101 receives an electronic message from the second HMD. The electronic message includes the audio content from the second user. In other words, the HMD worn by the second user includes a microphone that records speech from the second user. Operation 604 can be implemented with the data extraction module 404.

At operation 606, the HMD 101 generates AR content based on the electronic message. For example, the AR content includes a text translation of the audio content from the electronic message from the second user. Operation 606 can be implemented with the data computation module 406.

At operation 608, the HMD 101 displays the AR content in the display 204 based on the location of the second HMD relative to the first HMD (e.g., the HMD 101) such that the AR content appears coupled to the second HMD as perceived by the user 102. Operation 608 can be implemented with the AR content module 408.

Figure 7:
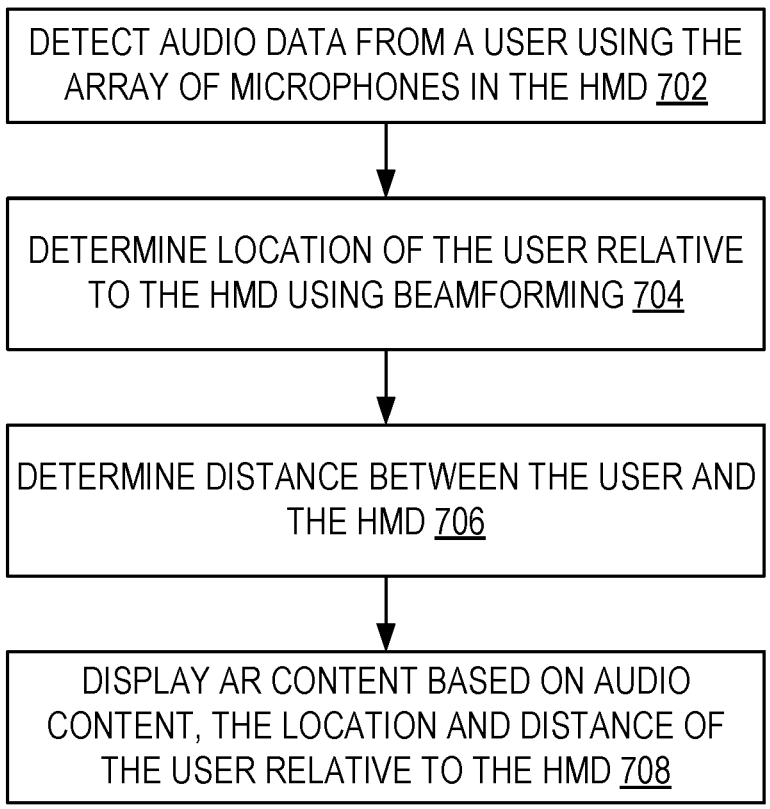
FIG. 7 is a flowchart illustrating a method for detecting audio data and displaying augmented reality content, according to an example embodiment.

FIG. 7 is a flowchart illustrating a method 700 for detecting audio data and displaying AR content, according to an example embodiment.

At operation 702, the HMD 101 receives audio content from a second user. The second user includes a person speaking to the user 102 of the HMD 101. This can be accomplished in several ways. In one example, the HMD 101 includes an array of microphones that records audio from the second user. Operation 702 can be implemented with the data extraction module 404.

At operation 704, the HMD 101 determines a location of the second user using a beamforming technique on the audio content from the array of microphones in the HMD 101. The HMD 101 detects that the second user is located within a preset radius of the HMD 101. Operation 704 can be implemented with the direction module 402.

At operation 706, the HMD 101 determines a distance between the second user and the HMD 101 using the array of microphones in combination with a distance sensor (e.g., a time-of-flight camera). Operation 706 can be implemented with the direction module 402.

At operation 708, the HMD 101 generates and displays AR content based on the audio content received from the second user. For example, the AR content includes a text translation of a speech from the second user. The HMD 101 displays the AR content in the display 204 based on the location of the second user relative to the HMD 101 such that the AR content appears coupled to the second user as perceived by the user 102. Operation 708 can be implemented with the AR content module 408.

Figure 8A:
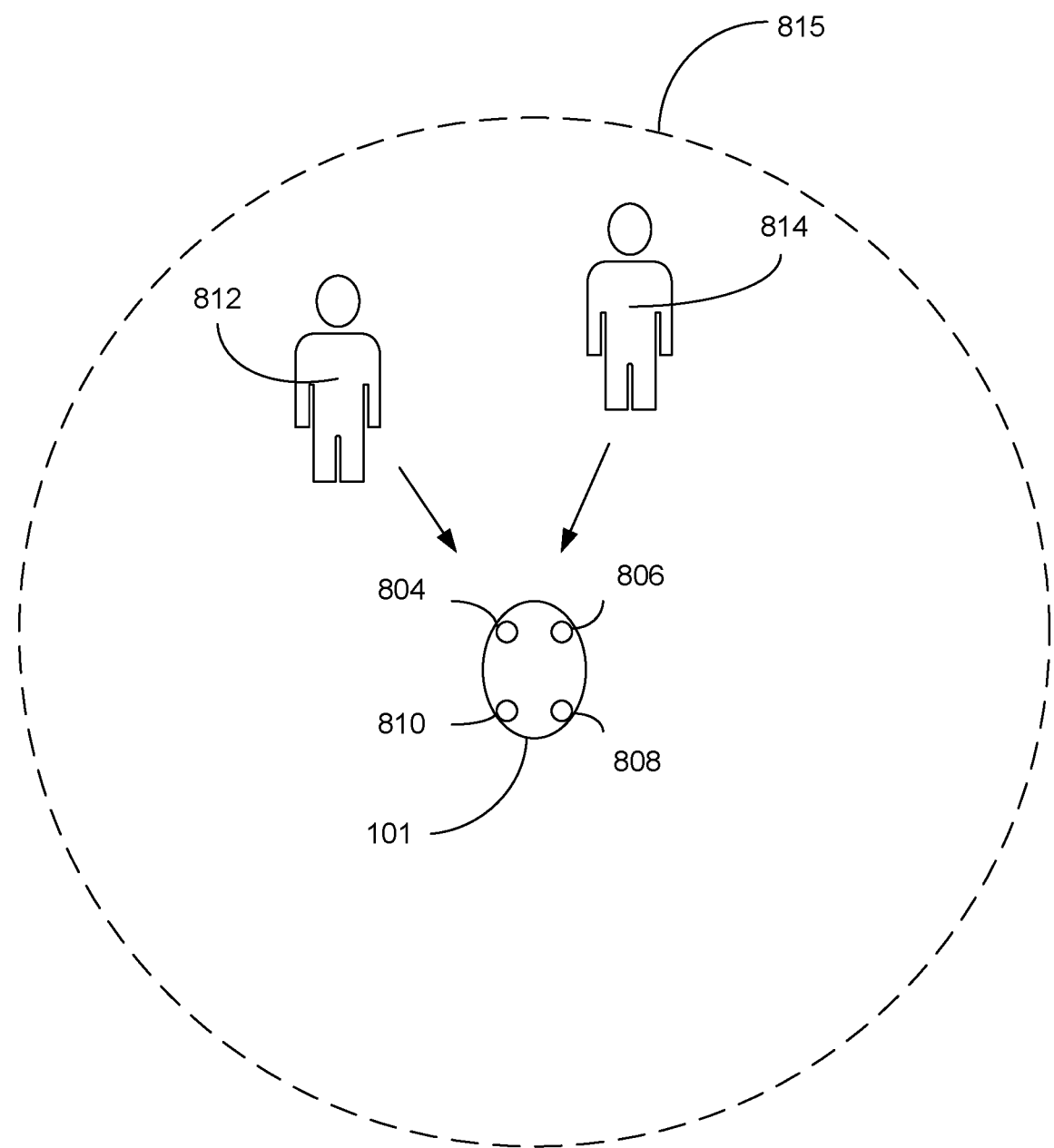
FIG. 8A is a block diagram illustrating an example of an HMD detecting audio from users.

FIG. 8A is a block diagram illustrating an example of the HMD 101 detecting audio from users 812, 814. The HMD 101 includes an array of sensors 804, 806, 808, and 810 disposed around the HMD 101. The array of sensors detects audio from the user 812 and the user 814. Beamforming techniques enable the HMD 101 to filter out audio content of the user 812 from the audio content of the user 814. The HMD 101 detects that both users 812, 814 are located within an area 815 of a preset radius.

Figure 8B:
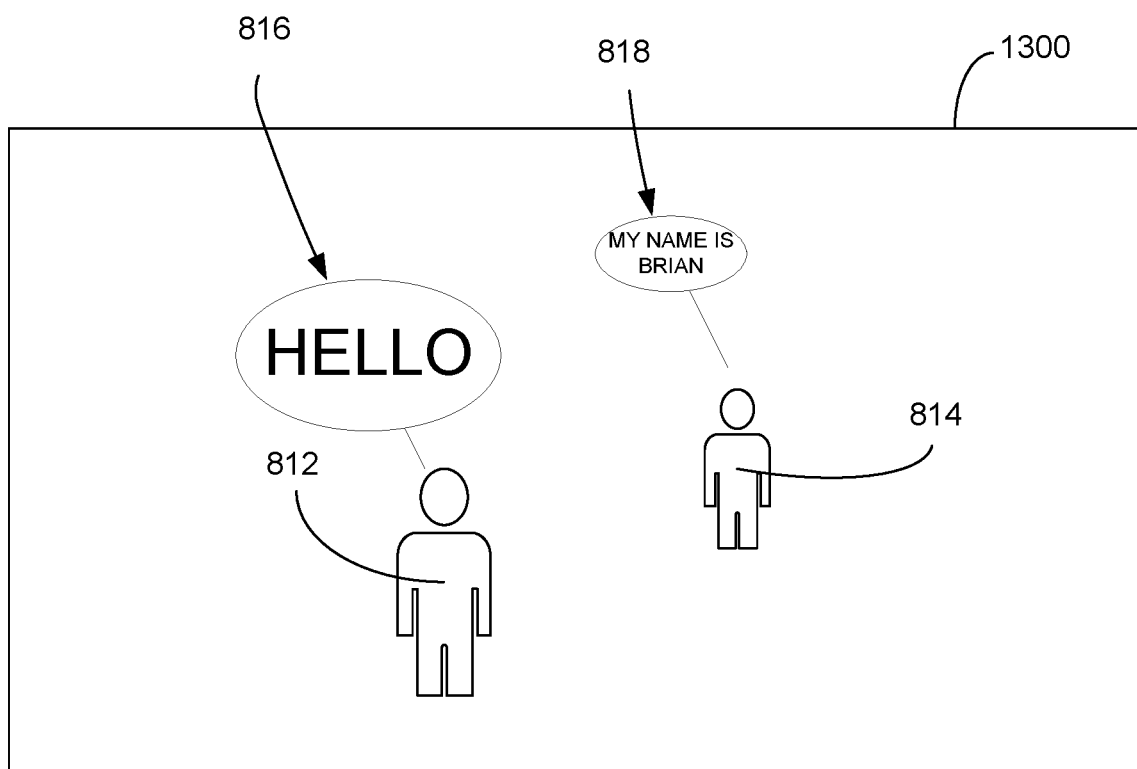
FIG. 8B is a block diagram illustrating an example of AR content being displayed in a display in the HMD illustrating the detected audio of FIG. 8A.

FIG. 8B is a block diagram illustrating an example of AR content being displayed in a transparent display 1300 in the HMD illustrating the detected audio of FIG. 8A. The transparent display 1300 displays AR content (e.g., speech bubbles 816, 818) as an overlay on top of the users 812 and 814. The speech bubble 816 appears to be coupled to the user 812. The speech bubble 818 appears to be coupled to the user 814. The speech bubble 816 includes a text of a translation of speech content from the user 812. The speech bubble 818 includes a text of a translation of speech content from the user 814. The size of the speech bubble 816 and the text therein is relatively larger than the size of the speech bubble 818 and the text therein since the user 812 is relatively closer to the HMD 101 than the user 814.

Figure 9A:
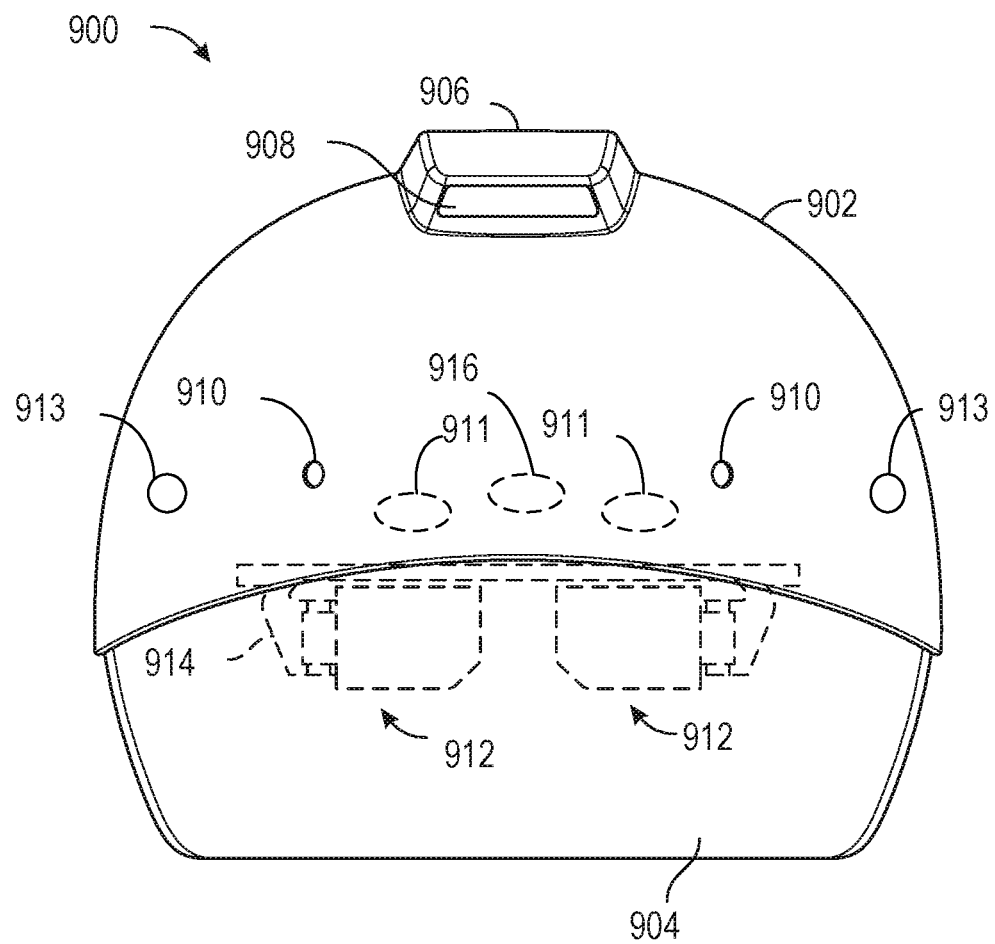
FIG. 9A is a block diagram illustrating a front view of a head-mounted device, according to some example embodiments.
Figure 9B:
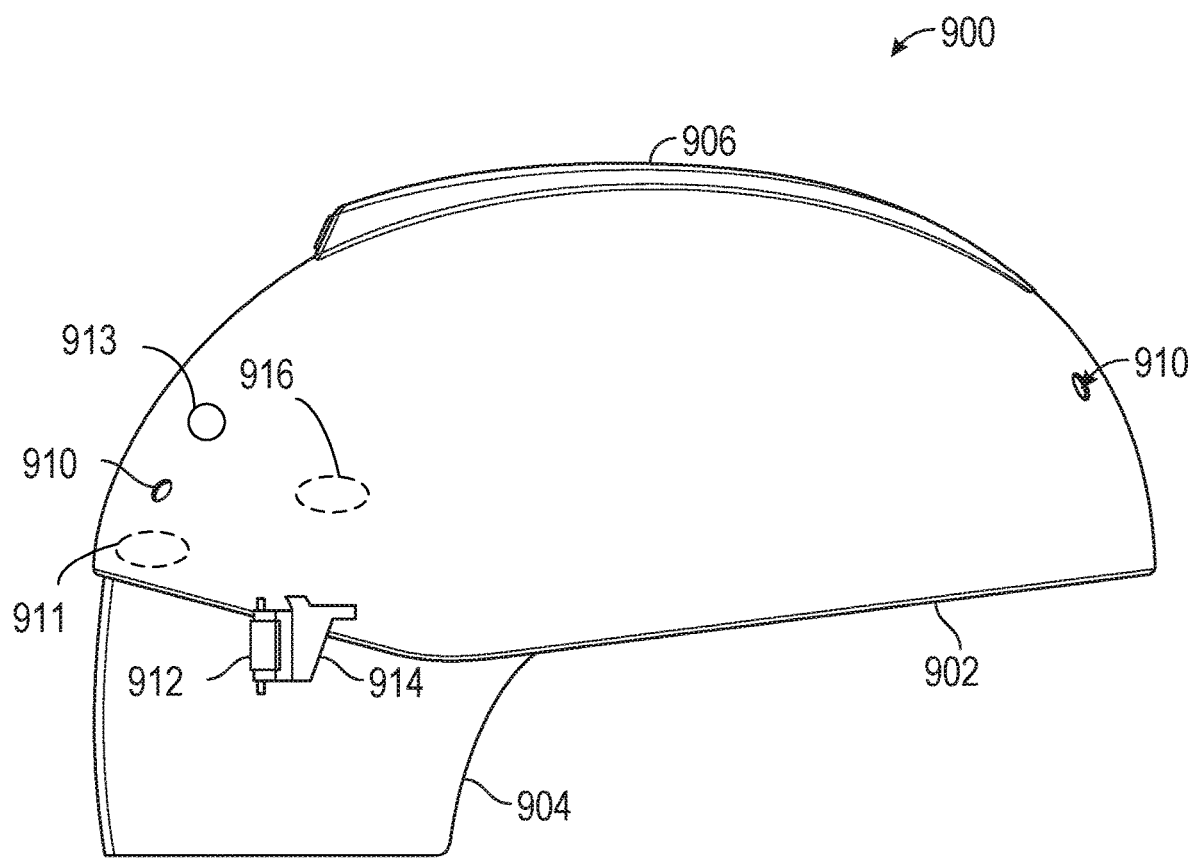
FIG. 9B is a block diagram illustrating a side view of the head-mounted device of FIG. 9A.

FIG. 9A is a block diagram illustrating a front view of a head-mounted device (HMD) 900, according to some example embodiments. FIG. 9B is a block diagram illustrating a side view of the HMD 900 of FIG. 9A. The HMD 900 may be an example of the HMD 101 of FIG. 1. The HMD 900 includes a helmet 902 with an attached visor 904. The helmet 902 may include sensors (e.g., optical and audio sensors 908 and 910 provided at the front, back, and a top section 906 of the helmet 902). Display lenses 912 are mounted on a lens frame 914. The display lenses 912 include the display 204 of FIG. 2. The helmet 902 further includes ocular cameras 911. Each ocular camera 911 is directed to an eye of the user 102 to capture an image of the iris or retina. Each ocular camera 911 may be positioned on the helmet 902 above and facing one eye. The helmet 902 also includes EEG/ECG sensors 916 to measure brain activity and a heart rate pattern of the user 102.

In another example embodiment, the helmet 902 also includes lighting elements in the form of LED lights 913 on each side of the helmet 902. An intensity or brightness of the LED lights 913 is adjusted based on the dimensions of the pupils of the user 102. The AR application 216 may control lighting elements to adjust a size of the iris of the user 102. Therefore, the AR application 216 may capture images of the iris at different sizes for different virtual objects.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 212 or a group of processors 212) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor 212 or other programmable processor 212) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 212 configured using software, the general-purpose processor 212 may be configured as respective different hardware modules at different times. Software may accordingly configure a processor 212, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 212 that are temporarily configured (e.g., by software) or permanently configured to perform the relevant operations. Whether temporarily or permanently configured, such processors 212 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 212 or processor-implemented modules. The performance of certain of the operations may be distributed among the one or more processors 212, not only residing within a single machine, but deployed across a number of machines. In some example embodiments, the processor or processors 212 may be located in a single location (e.g., within a home environment, an office environment, or a server farm), while in other embodiments the processors 212 may be distributed across a number of locations.

The one or more processors 212 may also operate to support performance of the relevant operations in a "cloud computing" environment or as a "software as a service" (SaaS). For example, at least some of the operations may be performed by a group of computers (as examples of machines including processors 212), these operations being accessible via a network 108 and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 212, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 212 executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 212), or in a combination of permanently and temporarily configured hardware may be a design choice. Below are set out hardware (e.g., machine) and software architectures that may be deployed, in various example embodiments.

Example Machine Architecture

Figure 10:
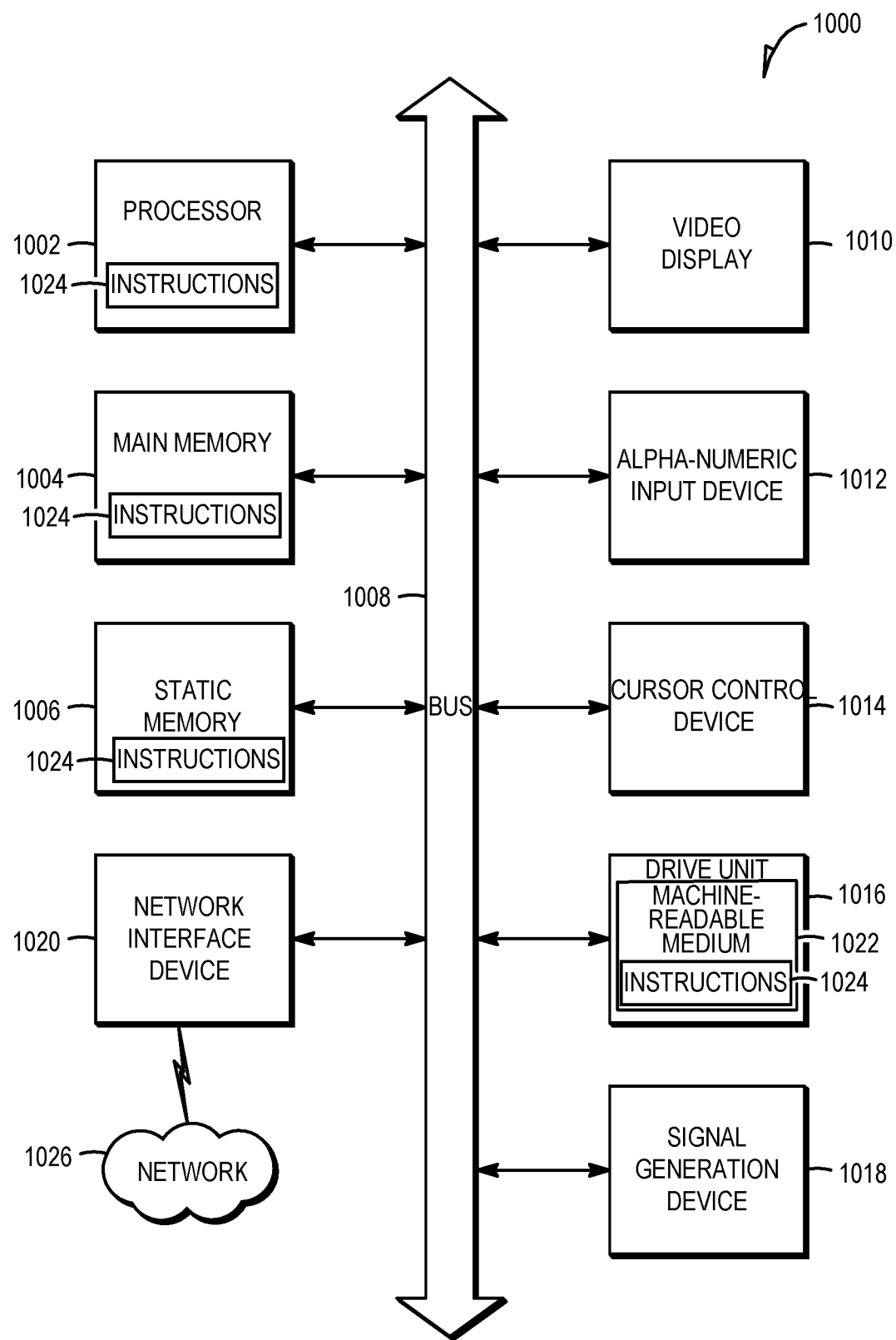
FIG. 10 is a block diagram illustrating components of a machine, according to some example embodiments, able to read instructions from a machine-readable medium and perform any one or more of the methodologies discussed herein.

FIG. 10 is a block diagram of a machine in the example form of a computer system 1000 within which instructions 1024 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers 110) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present embodiments, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communication network 1026 using a transmission medium. The instructions 1024 may be transmitted using the network interface device 1020 and any one of a number of well-known transfer protocols (e.g., hypertext transfer protocol (HTTP)). Examples of communication networks 1026 include a local-area network (LAN), a wide-area network (WAN), the Internet, mobile telephone networks, plain old telephone service (POTS) networks, and wireless data networks (e.g., Wi-Fi and WiMax networks). The term "transmission medium" shall be taken to include any intangible medium capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   generating, by a first head mounted device (HMD), location information describing a current geographic location of the first HMD, the location information being generated from sensor data captured by at least one sensor of the first HMD;
   transmitting the location information to a second HMD;
   receiving, from the second HMD, a communication to initiate a real-time data stream from the first HMD to the second HMD, the second HMD having transmitted the communication in response to determining, based on distance and direction of the second HMD, that the second HMD is within a threshold distance of the first HMD;
   in response to receiving the communication:
   capturing audio of a first user of the first HMD with a microphone of the first HMD,
   generating transcribed text from the audio using a speech recognition technique, and
   transmitting the transcribed text to the second HMD via the real-time data stream, wherein the second HMD generates augmented reality (AR) content based on the transcribed text included in the real-time data stream and displays the AR content on a transparent display of the second HMD based on the location information describing the current geographic location of the first HMD.

2. The method of claim 1, wherein the second HMD generates the AR content by:
   translating the transcribed text from a first language used by the first user to a second language selected by a second user of the second HMD, yielding a translation of the transcribed text, wherein the AR content includes the translation of the transcribed text.

3. The method of claim 1, wherein a size of text included in the AR content decreases in response to an increase in the distance of the second HMD relative to the first HMD.

4. The method of claim 1, further comprising:
   receiving, from a third HMD, a second communication to initiate a second real-time data stream from the first HMD to the third HMD;
   in response to receiving the second communication:
      capturing updated audio of the first user of the first HMD,
      generating second transcribed text from the updated audio using the speech recognition technique, and
      transmitting the second transcribed text to the third HMD via the second real-time data stream, wherein the third HMD generates second AR content based on the second transcribed text included in the second real-time data stream and displays the second AR content on a transparent display of the third HMD.

5. The method of claim 1, further comprising:
   determining, based on second location information of a third HMD, a current location of the third HMD relative to the first HMD, the location information of the third HMD identifying a distance and a direction of the third HMD relative to the first HMD, the third HMD being worn by a third user;
   determining, based on the current location of the third HMD, that the third HMD is within the threshold distance of the first HMD;
   initiating reception of a second real-time data stream from the third HMD, the second real-time data stream including second transcribed text generated by the third HMD from audio of the third user captured by a microphone of the third HMD, the third HMD having generated the second transcribed text using the speech recognition technique;
   generating second AR content based on the second transcribed text included in the second real-time data stream received from the third HMD; and
   displaying the second AR content on a transparent display of the first HMD, the second AR content displayed at a position of the transparent display of the first HMD based on the second location information of the third user such that the second AR content appears coupled to the third user when viewing the third user through the transparent display of the first HMD.

6. The method of claim 5, further comprising:
   generating the second location information of the third HMD by using adaptive beamforming on audio data received from the third user to determine the distance and the direction of the third HMD relative to the first HMD.

7. The method of claim 5, further comprising:
   receiving an electronic communication from the third HMD, the electronic communication including the second location information.

8. A first head mounted device (HMD) comprising:
   one or more computer processors; and
   one or more computer-readable mediums storing instructions that, when executed by the one or more computer processors, causes the first HMD to perform operations comprising:
      generating location information describing a current geographic location of the first HMD, the location information being generated from sensor data captured by at least one sensor of the first HMD;
      transmitting the location information to a second HMD;
      receiving, from the second HMD, a communication to initiate a real-time data stream from the first HMD to the second HMD, the second HMD having transmitted the communication in response to determining, based on distance and direction of the second HMD, that the second HMD is within a threshold distance of the first HMD;
      in response to receiving the communication:
         capturing audio of a first user of the first HMD with a microphone of the first HMD,
         generating transcribed text from the audio using a speech recognition technique, and
         transmitting the transcribed text to the second HMD via the real-time data stream, wherein the second HMD generates augmented reality (AR) content based on the transcribed text included in the real-time data stream and displays the AR content on a transparent display of the second HMD based on the location information describing the current geographic location of the first HMD.

9. The first HMD of claim 8, wherein the second HMD generates the AR content by:
  translating the transcribed text from a first language used by the first user to a second language selected by a second user of the second HMD, yielding a translation of the transcribed text, wherein the AR content includes the translation of the transcribed text.

10. The first HMD of claim 8, wherein a size of text included in the AR content decreases in response to an increase in the distance of the second HMD relative to the first HMD.

11. The first HMD of claim 8, the operations further comprising:
  receiving, from a third HMD, a second communication to initiate a second real-time data stream from the first HMD to the third HMD;
  in response to receiving the second communication:
    capturing updated audio of the first user of the first HMD,
    generating second transcribed text from the updated audio using the speech recognition technique, and
    transmitting the second transcribed text to the third HMD via the second real-time data stream, wherein the third HMD generates second AR content based on the second transcribed text included in the second real-time data stream and displays the second AR content on a transparent display of the third HMD.

12. The first HMD of claim 8, the operations further comprising:
  determining, based on second location information of a third HMD, a current location of the third HMD relative to the first HMD, the location information of the third HMD identifying a distance and a direction of the third HMD relative to the first HMD, the third HMD being worn by a third user;
  determining, based on the current location of the third HMD, that the third HMD is within the threshold distance of the first HMD;
  initiating reception of a second real-time data stream from the third HMD, the second real-time data stream including second transcribed text generated by the third HMD from audio of the third user captured by a microphone of the third HMD, the third HMD having generated the second transcribed text using the speech recognition technique;
  generating second AR content based on the second transcribed text included in the second real-time data stream received from the third HMD; and
  displaying the second AR content on a transparent display of the first HMD, the second AR content displayed at a position of the transparent display of the first HMD based on the second location information of the third user such that the second AR content appears coupled to the third user when viewing the third user through the transparent display of the first HMD.

13. The first HMD of claim 12, the operations further comprising:
  generating the second location information of the third HMD by using adaptive beamforming on audio data received from the third user to determine the distance and the direction of the third HMD relative to the first HMD.

14. The first HMD of claim 12, the operations further comprising:
  receiving an electronic communication from the third HMD, the electronic communication including the second location information.

15. A non-transitory computer-readable medium storing instructions that, when executed by one or more computer processors of a first HMD, causes the first HMD to perform operations comprising:
  generating location information describing a current geographic location of the first HMD, the location information being generated from sensor data captured by at least one sensor of the first HMD;
  transmitting the location information to a second HMD;
  receiving, from the second HMD, a communication to initiate a real-time data stream from the first HMD to the second HMD, the second HMD having transmitted the communication in response to determining, based on distance and direction of the second HMD, that the second HMD is within a threshold distance of the first HMD;
  in response to receiving the communication:
  capturing audio of a first user of the first HMD with a microphone of the first HMD,
  generating transcribed text from the audio using a speech recognition technique, and
  transmitting the transcribed text to the second HMD via the real-time data stream, wherein the second HMD generates augmented reality (AR) content based on the transcribed text included in the real-time data stream and displays the AR content on a transparent display of the second HMD based on the location information describing the current geographic location of the first HMD.

16. The non-transitory computer-readable medium of claim 15, wherein the second HMD generates the AR content by:
  translating the transcribed text from a first language used by the first user to the second language selected by a second user of the second HMD, yielding a translation of the transcribed text, wherein the AR content includes the translation of the transcribed text.

17. The non-transitory computer-readable medium of claim 15, wherein a size of text included in the AR content decreases in response to an increase in the distance of the second HMD relative to the first HMD.

18. The non-transitory computer-readable medium of claim 15, the operations further comprising:
  receiving, from a third HMD, a second communication to initiate a second real-time data stream from the first HMD to the third HMD;
  in response to receiving the second communication:
    capturing updated audio of the first user of the first HMD,
    generating second transcribed text from the updated audio using the speech recognition technique, and
    transmitting the second transcribed text to the third HMD via the second real-time data stream, wherein the third HMD generates second AR content based on the second transcribed text included in the second real-time data stream and displays the second AR content on a transparent display of the third HMD.

19. The non-transitory computer-readable medium of claim 15, the operations further comprising:
  determining, based on second location information of a third HMD, a current location of the third HMD relative to the first HMD, the location information of the third HMD identifying a distance and a direction of the third HMD relative to the first HMD, the third HMD being worn by a third user;

determining, based on the current location of the third HMD, that the third HMD is within the threshold distance of the first HMD;

initiating reception of a second real-time data stream from the third HMD, the second real-time data stream including second transcribed text generated by the third HMD from audio of the third user captured by a microphone of the third HMD, the third HMD having generated the second transcribed text using the speech recognition technique;

generating second AR content based on the second transcribed text included in the second real-time data stream received from the third HMD; and displaying the second AR content on a transparent display of the first HMD, the second AR content displayed at a position of the transparent display of the first HMD based on the second location information of the third user such that the second AR content appears coupled to the third user when viewing the third user through the transparent display of the first HMD.

20. The non-transitory computer-readable medium of claim 19, the operations further comprising:

generating the second location information of the third HMD by using adaptive beamforming on audio data received from the third user to determine the distance and the direction of the third HMD relative to the first HMD.

* * * * *